United States Patent [19]
Nance, Jr.

[11] Patent Number: 5,614,302
[45] Date of Patent: Mar. 25, 1997

[54] PROTECTIVE GARMENT UTILIZING HEAT STRESS REDUCTION FABRIC

[76] Inventor: Fred H. Nance, Jr., 3602 Bear Creek Rd., Thompson Station, Tenn. 37179

[21] Appl. No.: 495,933

[22] Filed: Jun. 28, 1995

[51] Int. Cl.$^6$ .................................................. B32B 7/00
[52] U.S. Cl. .............................................. 442/286; 442/304
[58] Field of Search ................................. 428/245, 252, 428/253, 272, 246, 262, 265

[56]       References Cited

U.S. PATENT DOCUMENTS

| | | | |
|---|---|---|---|
| 3,691,564 | 9/1972 | La Marre et al. . | |
| 3,911,498 | 10/1975 | Van Staagen . | |
| 4,338,686 | 7/1982 | Bell . | |
| 4,493,870 | 1/1985 | Vrouenraets et al. | 428/245 |
| 4,868,928 | 9/1989 | Norvell . | |
| 4,908,260 | 3/1990 | Dodia et al. | 428/215 |
| 5,014,357 | 5/1991 | Wiseman, Sr. | 2/81 |
| 5,036,551 | 8/1991 | Dailey et al. | 2/167 |
| 5,297,296 | 3/1994 | Moretz et al. . | |
| 5,364,678 | 11/1994 | Lumb et al. . | |

*Primary Examiner*—James J. Bell
*Attorney, Agent, or Firm*—Dority & Manning, P.A.

[57]       ABSTRACT

A protective garment is provided constructed of an improved moisture-transmitting fabric. The fabric includes a woven fabric substrate adhesively secured to a thermoplastic film. The film, which is hydrophilic and non-porous, is preferably made from a co-polyether-ester polymer. The woven fabric substrate is made from synthetic fibers such as polyester. The resulting composite fabric is capable of absorbing moisture through the film and transmitting it to the woven substrate. The fabric is stretchable, breathable, reusable, and washable. In one embodiment, a coating can be applied to the woven fabric substrate for making the composite fabric product water-resistant.

17 Claims, 2 Drawing Sheets

PROTECTIVE GARMENT UTILIZING HEAT STRESS REDUCTION FABRIC

BACKGROUND OF THE INVENTION

The present invention generally relates to protective garments, and more particularly to a protective garment made from a fabric that is water-resistant, monolithic, stretchable, machine washable, and that transmits moisture or perspiration away from a wearer for cooling a wearer in a heat stressed environment.

In industrial settings, workers are often required to work under unfavorable conditions. For instance, it is sometimes necessary to work in high temperature areas in order to repair or replace equipment, or to otherwise perform general maintenance tasks. Further, while performing a work assignment, a worker can be exposed to various potential hazards. For instance, the worker may have to work on or adjacent to steam lines, hot water lines, or other chemical supply lines. Often, potentially harmful particulate matter can also be present in the air.

In order to protect workers under these conditions, the workers are normally provided with protective garments arranged to be worn over a particular part of the body. In the past, these garments have been made from various impervious materials such as rubber or vinyl. Although successful in protecting the wearer, these garments tend to be heavy and thus make it difficult for the worker to maneuver. These garments are also hot to work in, limiting the amount of time a worker can spend in a heat stressed environment. Besides being hot due to their weight, the garments exhibit a tendency to trap moisture and perspiration. When working in high temperature areas, this phenomenon adds to the heat buildup within the garment, making the wearer very uncomfortable.

Those skilled in the art have been attempting to develop a protective garment made from a fabric that keeps moisture and perspiration away from a wearer. One such prior art garment, marketed by the assignee of the present invention, is made by coating a nonwoven fabric with a co-polyether-ester film. Unfortunately, this product is not washable nor recommended for reuse. As such, a need exists for a more durable garment that effectively transmits moisture away from a wearer and that can be washed and used repeatedly.

Various water-resistant and wind-proof garments have also been developed for general usage, such as for use by athletes or recreational enthusiasts. For instance, U.S. Pat. No. 5,364,678 to Lumb et al., is directed to a wind proof and water-resistant fabric. The fabric includes an inner layer of fabric, a first adhesive layer, a non-porous hydrophilic barrier layer, a second adhesive layer and an outer layer of fabric. The inner fabric layer may be formed of a hydrophobic material such as polyester which is rendered sufficiently hydrophilic to promote moisture transport. The barrier layer, on the other hand, is formed from a hydrophilic polyurethane. In conjunction with the adhesive layers, the barrier layer is constructed to allow water vapor molecules to travel therethrough.

In U.S. Pat. No. 4,868,928 to Noryell, a wind proof, weather-resistant lined garment material is disclosed. The material can be used in outdoor wear for golf, walking, tennis, hiking, soccer, and the like. The material includes an outer layer and an inner layer. The outer layer is made from an expandable knitted or woven textile fabric. The inner layer, on the other hand, is made from a layer of porous hydrophobic polymer, such as expanded polytetrafluoroethylene, and is coated with a hydrophilic layer of a polyurethane. The coating of polyurethane in turn is further bonded to a woven or knitted elastomeric textile layer. The inner layer is waterproof to liquid water, but still permits the transmission of water vapor.

U.S. Pat. No. 5,297,296 to Moretz et al. is directed to a moisture management elastic fabric. The fabric includes a moisture transport fabric layer constructed of hydrophobic yarns to wick moisture away from the skin. The fabric also includes a moisture dispersal fabric layer constructed of hydrophilic yarns which receives moisture from the hydrophobic moisture layer. Elastic yarns are integrated with the yarns of the two layers to form an elastic fabric. The disclosed fabric is primarily for use in the elastic regions of underwear.

Other absorbent garments are disclosed in U.S. Pat. No. 4,338,686 to Bell, in U.S. Pat. No. 3,911,498 to Van Staagen, and in U.S. Pat. No. 3,691,564 to LaMarre et al. However, various features, aspects and advantages of the present invention remain absent from the prior art.

Generally speaking, the present invention is directed to further improvements in the construction of protective garments. The garments are made from a fabric that is capable of transmitting moisture and perspiration away from the wearer making the fabric especially well suited for use in heat stressed environments. Unlike many prior art constructions, the fabric actually transports liquids away from the wearer instead of only being permeable to water vapor molecules. Consequently, the fabric immediately forces moisture away from the body and does not require a certain amount of moisture buildup and evaporation before transporting water vapor molecules as is necessary in much of the prior art. The protective garments of the present invention are more effective in cooling the body of the wearer, resulting in prolonged comfort and increased stay times in heat stressed areas.

Besides providing an innovative heat stress reduction system, the fabric and garments of the present invention also offer radiological protection and are resistant to attack by a wide range of chemicals including mild acids. The fabric is strong, tear-resistant, stretchable, drapable, waterproof, and breathable. The fabric, as opposed to being microporous, is also monolithic. Being monolithic or non-porous, the fabric offers protection against airborne particles.

Further, the protective garments made from the fabric are washable and reusable. Once disposed, the garments can be incinerated resulting in very minimal ash content.

SUMMARY OF THE INVENTION

The present invention recognizes and addresses various drawbacks of prior art constructions and methods. Accordingly, it is an object of the present invention to provide an improved fabric and protective garments made therefrom.

It is another object of the present invention to provide a protective garment and fabric that transports moisture and perspiration away from a wearer's body.

Another object of the present invention is to provide a garment and a fabric that is strong, tear-resistant, stretchable and breathable.

Still another object of the present invention is to provide a fabric and a garment that is waterproof.

Another object of the present invention is to provide a protective garment that is washable and reusable.

It is another object of the present invention to provide a fabric and a garment that protects the wearer from airborne particulate.

These and other objects of the present invention are achieved by providing a flexible and lightweight composite fabric used for making protective garments. The fabric is capable of transmitting moisture away from a wearer for cooling the wearer in a heat stressed environment. Further, the fabric is stretchable, breathable, and washable.

More specifically, the fabric is made from a woven fabric substrate secured to a hydrophilic and non-porous thermoplastic film. The film is a co-polyether-ester elastomer and is adapted to absorb moisture and to transmit the moisture to the woven fabric substrate.

The woven fabric substrate can be made from synthetic fibers such as polyester, nylon and rayon. In one embodiment, yarns of the fabric substrate can have a denier between about 40 to about 200. As used herein, the term "woven" is intended to indicate that the substrate is not manufactured from a non-woven material such as felt or synthetic non-woven fabrics used to make wipe cloths and the like. The fabric can have various configurations of weaves or knits all of which are to be included within the present meaning of the word "woven". In fact, a preferred embodiment utilizes a bi-directional weave or knit, such as a double-knit interlock, for allowing the resulting composite fabric to be stretched in two directions.

The hydrophilic thermoplastic film, on the other hand, is preferably less than about two (2) mils thick. The co-polyether-ester elastomer used to make the film can contain from about 40% to about 60% by weight ester units.

As stated above, the resulting composite fabric product is flexible and lightweight. In one embodiment, the fabric can be coated with a water-resistant coating for providing exterior protection from water and other liquids.

These and other objects are also achieved by providing a protective garment adapted to transmit moisture away from a wearer in a heat stressed environment. In presently preferred embodiments, the garment is stretchable, washable, and reusable. The protective garment includes a covering adapted to cover and protect a predetermined area of a wearer's body. The covering is made of a composite fabric.

The composite fabric includes an outer layer made from a woven fabric substrate. Specifically, the woven fabric substrate is made from synthetic fibers. The layered fabric also includes an inner liner being made from a non-porous, hydrophilic film. The film, which is preferably a co-polyether-ester thermoplastic polymer, is adhesively secured to the woven fabric substrate.

In one embodiment, the non-porous, hydrophilic film has a thickness from about 0.5 mils to about 1.5 mils. The woven fabric substrate, which can be made from polyester, rayon, nylon and mixtures thereof, can have a double-knit construction and yarn denier from about 40 to about 200. The exterior side of the fabric substrate can also be treated with a water-resistant coating.

Other objects, features, and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
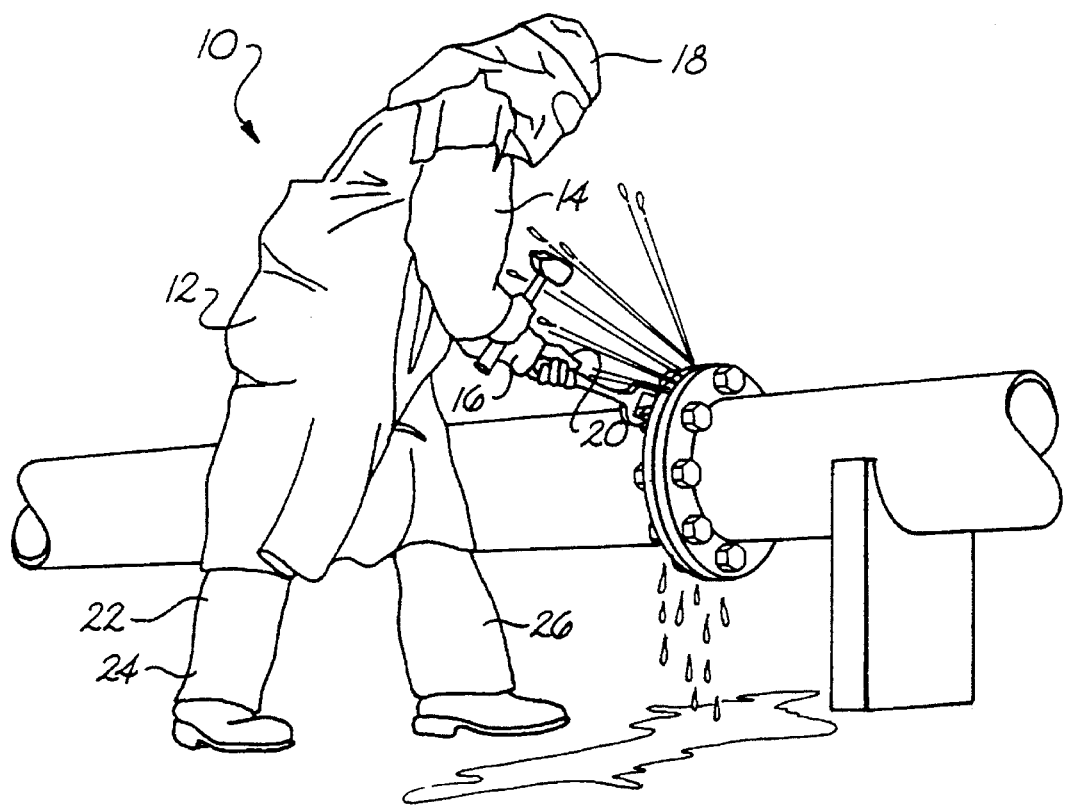
FIG. 1 is a perspective view of a user wearing a protective garment made according to the present invention in a heat-stressed environment.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally, the present invention is directed to protective garments made from an improved moisture transmitting fabric. The fabric is highly absorbent to moisture, rapidly causing the evacuation and evaporation of sweat and perspiration from within the garment. Referring to FIG. 1, a maintenance worker is shown repairing a ruptured line in an industrial setting. The worker is wearing a protective garment generally 10, made in accordance with the present invention. Garment 10 is not only protecting the worker from the fluid being emitted from the ruptured line but is also simultaneously carrying sweat and perspiration away from the worker's body.

As shown, in this embodiment, protective garment 10 includes an outer covering 12 having a first sleeve 14 and a second sleeve 16 adapted to completely cover the arms of the worker.

Protective garment 10 further includes a pair of gloves 20 and a protective hood 18. As shown, the worker is also wearing a bib or coverails 22 which have a first leg 24 and a second leg 26. Outer covering 12, hood 18, gloves 20, and coverails 22 can all be made from a moisture transmitting fabric according to the present invention. Further, besides being used to make a multi-item garment as shown, the fabric can be used to construct a single piece bag suit adapted to cover the entire body.

Besides carrying moisture away from the wearer, the fabric is flexible, stretchable, lightweight, breathable, water-resistant, and washable. As shown by the radioactive symbol in the drawing, the fabric by being non-porous may also provide some protection against airborne radioactive particulate matter.

Protective garments made according to the present invention can be used in a variety of applications. For example, the garments are particularly well suited for use in nuclear power plants and for most decontamination applications. Being non-porous, the garments can also be used to protect a wearer against airborne particulate matter. By way of example, the garments may be worn during general maintenance jobs, during oil cleanups, and even by athletes during athletic events.

As shown in FIG. 1, garment 10 can be used as an exterior covering. The garment can be worn next to the skin or can be worn over other clothing items. The protective garment can also be worn as an undergarment when more durable or sophisticated suits need to be worn in a particular environment.

Figure 2:
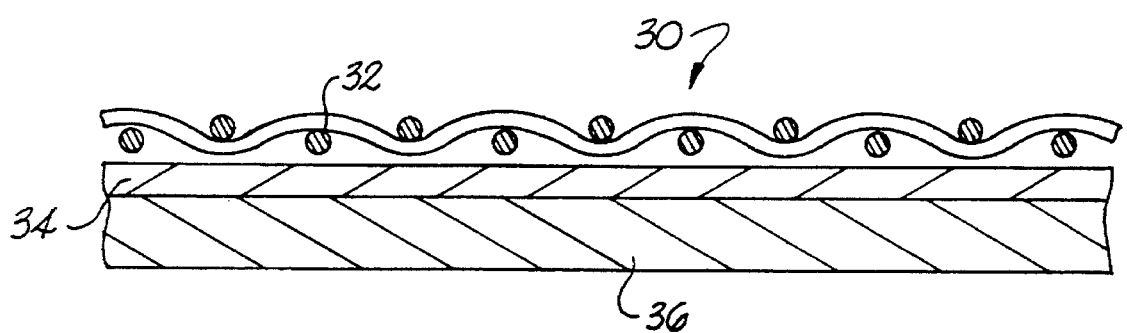
FIG. 2 is a cross-sectional view of a preferred fabric utilized in the protective garment of FIG. 1.

Referring to FIG. 2, a simplified cross-sectional diagram of a composite fabric generally 30 used to make protective garment 10 is illustrated. Fabric 30, in this embodiment, includes three layers: a woven fabric substrate 32, an adhesive layer 34, and an inner lining 36 made from a hydrophilic, non-porous film. The hydrophilic, non-porous film is preferably made from a co-polyether-ester polymer. Film 36 is capable of absorbing water and transmitting it to the fabric substrate.

As stated above, in the past, the assignee of the present invention had marketed protective garments made from a two layered fabric having a nonwoven substrate. Specifically, the fabric was made by extrusion-coating SONTARA nonwoven fabric, obtained from E. I. DuPont de Nemours & Company, with a co-polyether-ester film. Being made with a nonwoven fabric, this product, can only be used a single time before being disposed. The garments are not washable nor recommended for reuse.

The fabric of the present invention, on the other hand, is much more durable, is washable and is reusable. In fact, garments made according to the present invention can often be machine washed over twenty (20) times before showing any signs of substantial wear. In developing the fabric of the present invention, it was discovered that preferably a woven or knitted fabric substrate is incorporated into the garments and that an adhesive is used to assist in bonding the co-polyether-ester film to the woven substrate. As such, fabric 30 as shown in FIG. 2 includes intermediate adhesive layer 34.

Composite fabric 30, as shown in FIG. 2, will now be discussed in greater detail. First, as described above, outer layer 32 is made from a woven fabric. Preferably, the woven fabric is made from synthetic fibers such as polyester, rayon, nylon, or mixtures thereof. Polyester materials are particularly useful because they are inherently resistant to mild acids. However, other synthetic materials can be used in order to selectively enhance various characteristics, such as strength.

Although any woven synthetic fabric may be used, preferably the fabric has a bi-directional weave or knit, such as a double knit interlock. A bi-directional weave or knit allows the fabric to stretch in two directions. One type of polyester fabric known for its stretch characteristics is SPANDEX, which can also be incorporated into the layered fabric product.

The yarn denier of the woven fabric substrate preferably falls within a range of between about 40 to about 200. At higher deniers, however, the fabric begins to have a very textured and multiporous surface which may require the polymer film bonded to the fabric to have a greater thickness in order to fill all the interstices of the fabric and to form a continuous layer. Also, higher denier fabrics generally are not as washable nor do they breathe as well as lower denier fabrics. Consequently, preferably the substrate has a yarn denier between about 40 and about 150, and most preferably around 70.

In one exemplary construction a polyester double knit interlock fabric is used having a yarn denier of about 70. The fabric weight is about 9 oz. per linear yard. Of course, the fabric weight can be varied as desired.

Inner lining 36, as stated above, is made from a hydrophilic, non-porous film that is adhesively secured to woven fabric substrate 32. Being non-porous or monolithic, the polymer film is impermeable to particulate matter. Also, the film is liquid absorbent and capable of transmitting moisture therethrough. When bonded to fabric substrate 32, the film increases the strength of the overall composite of the woven substrate.

A commercially available co-polyether-ester polymer that may be used in the present invention is HYTREL polyester elastomer, marketed by E. I. DuPont de Nemours & Company. Specifically, HYTREL, which is a breathable butylene/poly (alkylene ether) phthalate film, is available in various different grades ranging in Shore hardness from D35 to D82, and ranging in flexural modulus from about 35 MPa to about 1,210 MPa. In a preferred embodiment, the film contains from about 40% to about 60% by weight ester units. For instance, HYTREL style 8206, which can be incorporated into the fabric of the present invention, contains about 45% by weight short chain ester units. Of course, other grades of the copolymer may work equally as well.

The thickness of the polyester copolymer film should preferably be less than about 2 mils. In general, increasing the thickness of the film decreases its breathability. In an exemplary construction, the film is approximately 1 mil thick. As described above, however, the thickness of the film may be dependant upon the yarn denier of the fabric substrate.

The polymer film incorporated into the present invention is particularly advantageous for use in a protective garment because it is non-porous and because it is capable of efficiently transmitting moisture. Unlike most of the prior art, the film is capable of transmitting liquids and is not solely permeable to water vapor.

An effective way to measure the capability of a material to transmit moisture is to test for its moisture vapor transmission rate. This test measures the amount of vapor that travels through a particular thickness of material over a predetermined area over a preselected period of time. The co-polyether-ester film used in the present invention has a moisture vapor transmission rate greater than 10,000 gm/m$^2$/ 24 hrs for films 0.001 inches thick. Generally, transmission rates greater than 10,000 gm/m$^2$/24 hrs are preferred for garments worn during moderate to heavy work loads.

As represented by adhesive layer 34, the co-polyester polymer film used in the present invention can be, at least in part, secured to the woven fabric substrate using a solvent adhesive. The adhesive functions to generally increase the bond formed between the polymer film and the woven fabric. By bonding the polymer film to the woven fabric substrate using an adhesive, a fabric composite is produced that is washable and reusable, unlike the prior art disposable fabric discussed above.

The particular adhesive incorporated into the fabric of the present invention ideally assists in bonding the polymer film to the fabric substrate without interfering with the transmission of moisture through the fabric. In one embodiment, a urethane adhesive may be used. The urethane adhesive can be mixed with a solvent for making the adhesive easier to spread and apply. In particular, the urethane adhesive can be dissolved in a toluene or propyl alcohol solvent. Preferably, propyl alcohol is used since it is less hazardous.

Of course, other adhesives may be used in the present invention. It is to be understood that any suitable or desirable adhesive may be incorporated into the composite fabric product. As described above, the adhesive preferably does not adversely affect the transmission of moisture through the fabric.

Optionally, the composite fabric of the present invention can include other layers of materials for providing other benefits and advantages. For instance, a water-repellant coating can be applied to the exterior surface of the woven fabric substrate. By applying a water-repellant layer, the composite fabric becomes waterproof without interfering with the transmission of moisture from within. Generally, it is believed that any commercially available durable water-resistant (DWR) coating may be applied to the layered fabric. In a preferred embodiment, a fluorocarbon TEFLON-based coating is used. This product, which can be sprayed onto the layered fabric, is commercially available from E. I. DuPont de Nemours & Company.

In constructing the layered fabric of the present invention, generally, the thermoplastic film is heat bonded, using pressure and the adhesive, to the woven fabric substrate. In one embodiment, the thermoplastic polymer is first melted and cast onto liner paper. The coated liner paper is then heated and sprayed with an adhesive. The polymer film is heated until partially melted for producing a tacky substance. After being heated, the polymer is then laminated, using pressure, to the woven fabric substrate.

After combining the copolymer film with the woven fabric, the resulting layered product can be further heated or baked in order to cure the composite material and to evaporate any solvents that were present within the adhesive solution. After the solvents are removed, the layered fabric becomes a cohesive material.

The formed layered fabric can be used to make protective garments designed to cover and protect a particular part of the body. In making the garments, the seams can be either heat bonded together, electronic welded, RF welded, safety stitched or formed in any other suitable manner. The garment can also include elastic secured to the ends of any sleeves or pant legs for providing a tight fit between the garment and a wearer's wrist and ankles.

Figure 3:
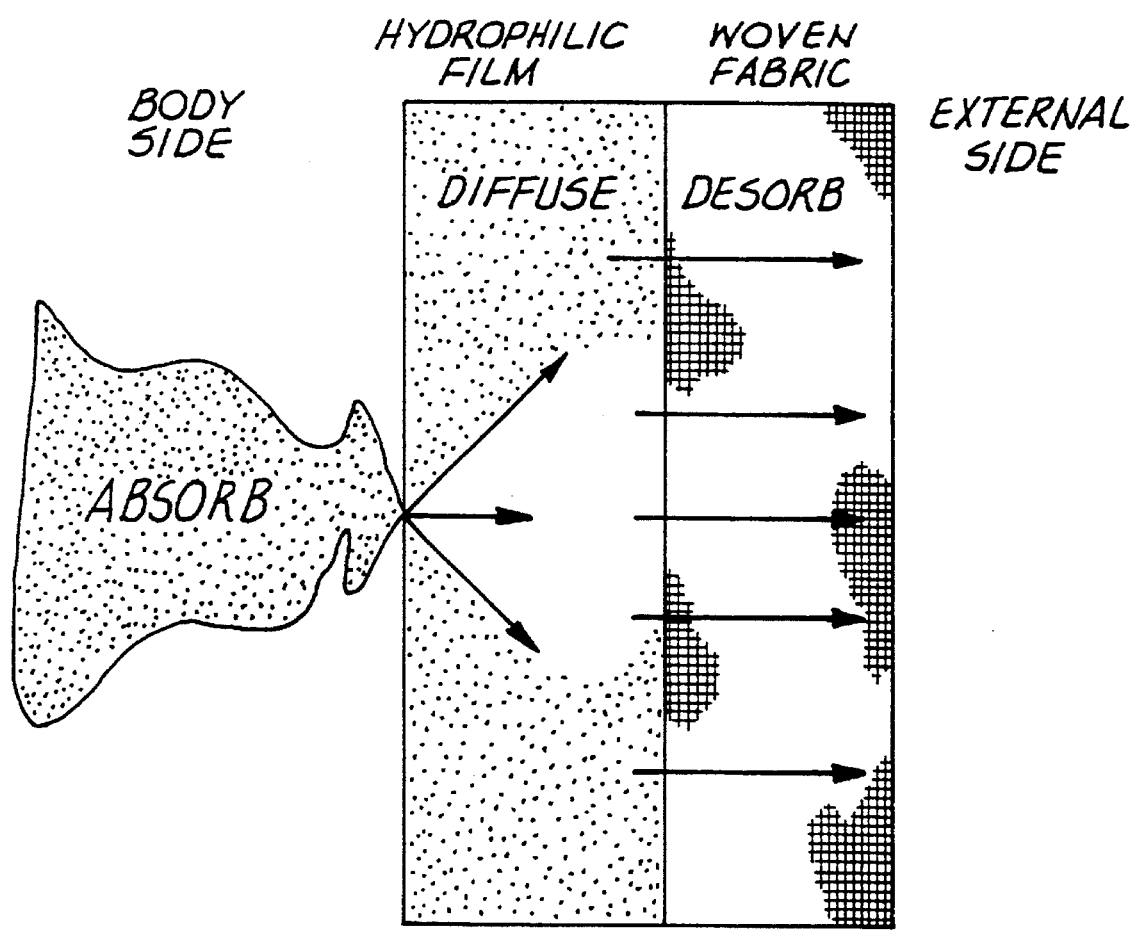
FIG. 3 is a diagrammatical illustration showing the manner in which the present invention transmits moisture.

One of the principal advantages of the finished fabric product is its ability to absorb and transmit moisture away from a wearer in heat stressed environments. Referring to FIG. 3, a simple diagram is illustrated showing the process by which body moisture is transmitted through the layered fabric. As shown, moisture, such as perspiration or sweat, is absorbed by the hydrophilic, copolymer film. Once absorbed, the humidity is diffused through the film and into the woven fabric. From the woven fabric, the moisture is ultimately desorbed or removed. Specifically, the moisture is evaporated into the surrounding environment.

Through this process, a user wearing a garment according to the present invention is protected from becoming overheated, while, simultaneously, being protected from the outside environment.

Besides being capable of transmitting moisture, the layered fabric product of the present invention is strong, tear-resistant, stretchable, drapable, flexible and lightweight. The fabric is substantially non-porous offering protection against airborne particulate matter. Further, the resulting fabric is washable and reusable. In one embodiment, the fabric has been found to be capable of being machine washed 20 to 25 times before showing any signs of substantial wear.

One embodiment of a layered fabric according to the present invention as shown in FIG. 2 was constructed and tested. The fabric included an outer layer made from a knitted polyester. The fabric was constructed of 70 denier polyester yarn specifically configured in a double knit interlock for allowing the fabric substrate to be stretched in two directions. HYTREL co-polyether-ester thermoplastic film, style 8206, was adhesively secured to one side of the fabric substrate. The thermoplastic film had a thickness of approximately 1 mil. On the other side of the fabric substrate, a TEFLON-based water-resistant coating was applied.

An Elmendorf Tear test was performed on the composite fabric to determine its tear strength in two directions. Specifically, in the warp direction, the fabric was capable of withstanding up to 10.44 oz./sq. yd. of force while in the fill direction, the fabric was capable of withstanding up to 6.5 oz./sq. yd. of force. A standard Mullen hydrostatic burst test was also performed on the fabric in order to determine its ability to withstand a hydrostatic force. Each side of the fabric was tested. It was determined that the fabric could withstand 68 PSI of pressure when the fabric substrate was placed adjacent the pressure source. When the thermoplastic film side of the fabric was placed adjacent to the pressure source, on the other hand, the fabric withstood 147 PSI of pressure.

Besides the above example and the parameters mentioned above, other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A protective garment adapted to transmit moisture away from a wearer in a heat stressed environment, said garment being washable and reusable, said protective garment comprising:

a covering adapted to cover and protect a predetermined portion of a wearer's body, said covering being made of a composite fabric, said fabric including:
(a) an outer layer comprising a woven or knitted fabric substrate, said woven or knitted fabric substrate being made from synthetic fibers; and
(b) an inner liner comprising a non-porous, hydrophilic film adhesively secured to said woven or knitted fabric substrate, said film being adapted to absorb moisture and to transmit same to said outer layer, said film consisting of a co-polyether-ester polymer.

2. A protective garment as defined in claim 1, wherein said non-porous, hydrophilic film has a thickness of less than approximately 2.0 mils.

3. A protective garment as defined in claim 2, wherein said non-porous, hydrophilic film has a thickness from about 0.5 mils to about 1.5 mils.

4. A protective garment as defined in claim 1, wherein said fabric substrate has a double knit interlock construction of yarn having a denier falling within a range of about 40 to about 200.

5. A protective garment as defined in claim 1, wherein said woven or knitted fabric substrate is constructed of polyester yarn.

6. A protective garment as defined in claim 1, wherein said composite fabric further includes a water-resistant coating applied to an exterior surface of said outer layer opposite said inner liner, said water-resistant coating comprising a TEFLON-based solvent for making said protective garment water-resistant.

7. A protective garment as defined in claim 1, wherein said composite fabric has a moisture vapor transmission rate of at least 10,000 g/m$^2$/24 hrs/mil.

8. A protective garment made from a washable, impervious material, said material comprising a liquid transmitting composite fabric for carrying perspiration and sweat away from a wearer's body, said composite fabric including:

a woven or knitted fabric substrate having an interior surface and an exterior surface, said woven or knitted fabric substrate being made from a material selected from the group consisting of polyester, rayon, nylon, and mixtures thereof;

an inner liner comprising a co-polyether-ester film adhesively bonded to said interior surface of said fabric substrate, said film being hydrophilic, non-porous and water absorbable; and a water resistant coating applied to said exterior surface of said fabric substrate.

9. A protective garment as defined in claim 8, wherein said composite fabric has a moisture vapor transmission rate of at least 10,000 g/m$^2$/24 hrs/mil.

10. A protective garment as defined in claim 8, wherein said fabric substrate of said composite fabric comprises polyester yarn, having a double knit interlock configuration.

11. A protective garment as defined in claim 10, wherein said polyester yarn has a denier from about 40 to about 200.

12. A protective garment as defined in claim 8, wherein said inner liner of said composite fabric is from about 0.5 mils to about 1.5 mils thick.

13. A protective garment as defined in claim 8, wherein said co-polyether-ester film contains from about 40% to about 60% by weight ester units.

14. A garment made from a flexible, lightweight and washable material, said material comprising a liquid transmitting composite fabric for carrying perspiration and sweat away from a wearer's body, said composite fabric comprising:

an outer layer comprising a knitted fabric substrate, said knitted fabric substrate being made from synthetic fibers and having a double knit interlock construction of yarn having a denier falling within the range of about 40 to 200;

an inner liner comprising a co-polyether-ester film adhesively bonded to one side of said outer layer, said film being hydrophilic, non-porous and water absorbable, said film having a thickness of less than about 2 mils; and a water-resistant coating applied to an exterior surface of said outer layer opposite said inner liner.

15. A garment as defined in claim 14, wherein said co-polyether-ester film contains from about 40% to about 60% by weight ester units.

16. A garment as defined in claim 14, wherein said woven or knitted fabric substrate is made from a material selected from the group consisting of polyester, nylon, rayon and mixtures thereof.

17. A garment as defined in claim 14, wherein said composite fabric has a moisture vapor transmission rate of at least 10,000 g/m$^2$/24 hrs/mil.

* * * * *